United States Patent [19]

Daniel

[11] 4,181,034

[45] Jan. 1, 1980

[54] CHAIN DRIVE MEANS FOR A BICYCLE OR THE LIKE

[76] Inventor: Jacques Daniel, 78 Boulevard Gambetta, 29200 Brest, France

[21] Appl. No.: 900,504

[22] Filed: Apr. 27, 1978

[30] Foreign Application Priority Data

May 3, 1977 [FR] France .................................. 77 13405

[51] Int. Cl.² .................... F16H 55/30; G05G 1/14
[52] U.S. Cl. ............................... 74/243 NC; 74/217 B; 74/594.2
[58] Field of Search .......... 74/217 R, 217 B, 243 NC, 74/217 CV, 594.2, 594.1

[56] References Cited

FOREIGN PATENT DOCUMENTS

| | | | |
|---|---|---|---|
| 608728 | 2/1933 | Fed. Rep. of Germany ..... | 74/243 NC |
| 797600 | 4/1936 | France ............................... | 74/243 NC |
| 880851 | 4/1943 | France ............................... | 74/243 NC |
| 965383 | 9/1950 | France . | |
| 1026010 | 4/1953 | France ............................... | 74/217 B |
| 229867 | 12/1974 | France . | |
| 2315427 | 6/1975 | France . | |
| 2313253 | 6/1975 | France . | |
| 266781 | 6/1928 | Italy .................................. | 74/243 NC |
| 404330 | 6/1943 | Italy .................................. | 74/243 NC |
| 419367 | 3/1947 | Italy .................................. | 74/243 NC |
| 423519 | 7/1947 | Italy .................................. | 74/243 NC |
| 73880 | 12/1916 | Switzerland ...................... | 74/217 B |
| 327681 | 4/1930 | United Kingdom .............. | 74/243 NC |
| 710133 | 6/1954 | United Kingdom .............. | 74/217 B |
| 1156529 | 6/1969 | United Kingdom . | |

*Primary Examiner*—Leslie Braun
*Attorney, Agent, or Firm*—Lawrence E. Laubscher

[57] ABSTRACT

A drive mechanism is disclosed for driving the chain of a bicycle, motorbike or the like, including a sprocket gear adapted for rotatable connection at its center with the vehicle frame, the sprocket gear periphery including a pair of diametrically opposed portions of corresponding cycloid configuration, and a pair of foot pedal crank arms connected with, and extending diametrically outwardly from the center of, the sprocket gear, the crank arms being angularly advanced, relative to the minor axis of the sprocket gear, in the power supplying direction of rotation by an angle of from about 30° to about 40°. In one modification, the cycloid portions are spaced in the direction of the minor axis of the sprocket gear, the adjacent ends of the cycloid surfaces being joined by tangentially arranged arcs of a circle the diameter of which equals the length of the major axis of the cycloid. In order to provide change speed gearing capability, a second corresponding sprocket gear of different size may be connected adjacent and coaxially with the first sprocket gear.

5 Claims, 5 Drawing Figures

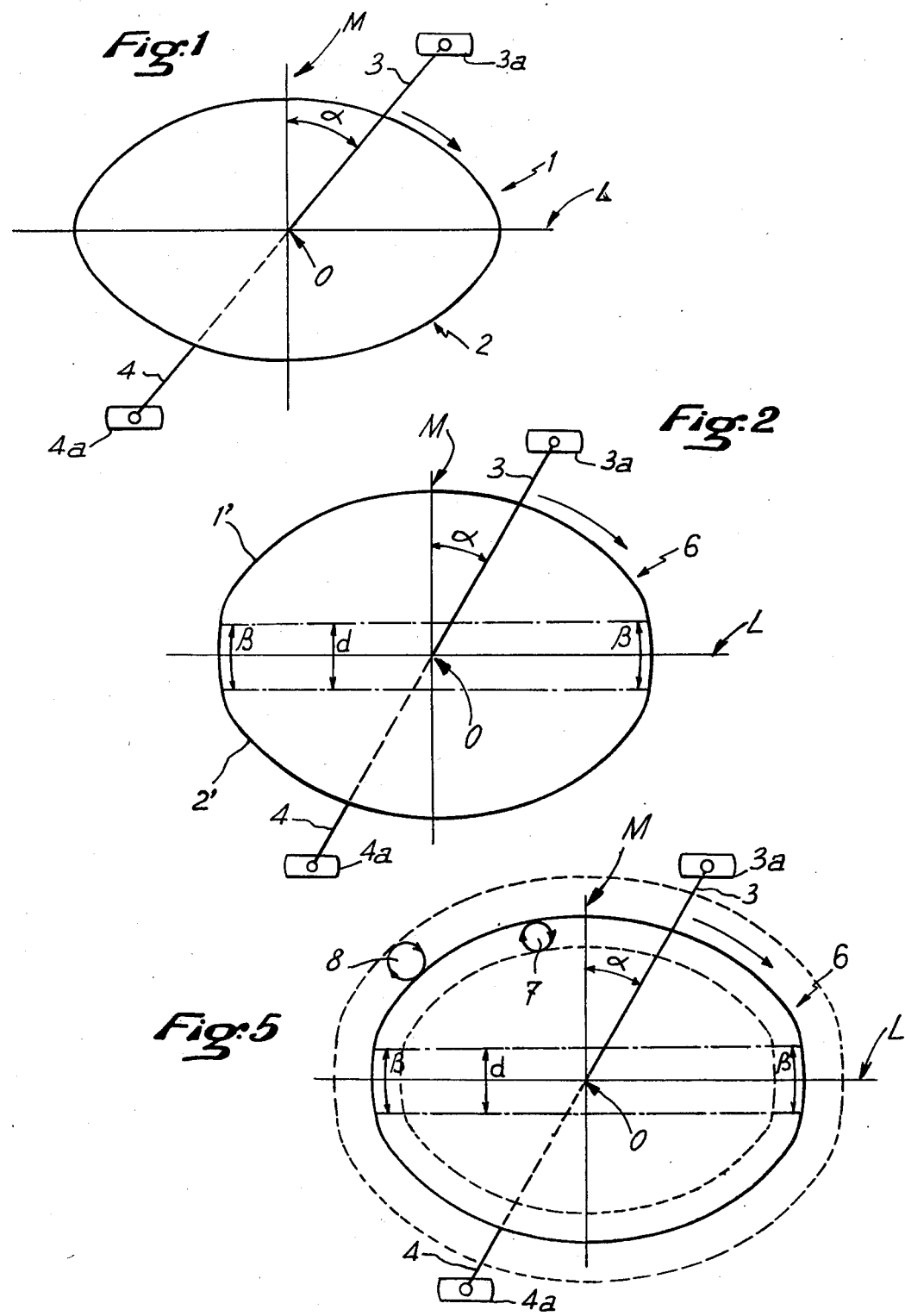

CHAIN DRIVE MEANS FOR A BICYCLE OR THE LIKE

BRIEF DESCRIPTION OF THE PRIOR ART

It is known in the patented prior art to provide drive sprocket gears for bicycles, motorbikes or the like that are of elliptical or oval configuration, as evidenced, for example, by the French Pat. Nos. 965,383, 2,295,867, 2,313,253, and 2,315,427, and the British Pat. No. 1,156,529. In the aforementioned French Pat. No. 2,313,253, the foot pedal crank arms are arranged at a relatively small angle (namely, 10°) forwardly of the minor axis of the ellipse in the direction of rotation of the sprocket gear.

These elliptical or oval sprocket gear configurations were developed with the knowledge that each foot of the rider does effective work only along a crank-gear circle arc beginning about 20° after the highest point and ending about 140° after that point. It follows from this that, during a rather important portion of crank-gear rotation, each leg and each foot thus perform useless efforts.

This is why an attempt has been made to reduce the useless efforts of the foot and the leg.

In other words, the important thing is to obtain a development variable as a function of the position of the cranks of the crank gear. When the foot and the leg are not in a favorable position, it is necessary to provide initially a small development, and progressively to provide a large development when the position of the foot and the leg become more and more favorable.

As indicated above, it has thus been proposed in the prior art, in order to obtain this result, to replace the toothed circular crown of the crank-gear with a toothed crown having an oval or elliptical shape. Crank-gears comprising crowns thus shaped theoretically present more or less major advantages depending upon the configuration adopted, but in actual practice, it has proved difficult and expensive to manufacture such sprocket gears, and to achieve the desired improved operating characteristic.

SUMMARY OF THE INVENTION

The present invention was developed to provide an improved drive sprocket gear having better operating characteristics than the previously proposed elliptical or oval sprocket gear. The sprocket gear of the present invention approaches the cycloid described by the user's foot when compared to a base line extending parallel to the ground, thereby to regularize the efforts by giving the crank-gear plate a cycloidal shape and by staggering the cranks in an appropriate manner with respect to this improved crank-gear.

Accordingly, a primary object of the present invention is to provide improved drive means for the chain of a bicycle, motorbike or the like including a first sprocket gear adapted for rotatable connection at its center with the vehicle frame, said sprocket gear having in circumferential profile a pair of diametrically opposed peripheral portions each having the configuration of a cycloid, in combination with a pair of aligned foot pedal crank arms connected with and extending diametrically outwardly from the center of the sprocket gear, said crank arms being angularly advanced, relative to the minor axis of the sprocket gear, in the power supplying direction of rotation, by a relatively large angle of from about 30° to about 40°.

According to another object of the invention, the cycloidal portions of the sprocket gear are spaced in the direction of the minor axis of the gear, the adjacent ends of the cycloid being connected by, and tangent to, arcs of a circle having a diameter that corresponds with the length of the major axis of the cycloid.

A further object of the invention is to provide change-speed chain drive means including a pair of said sprocket gears connected in coaxial relation, said sprocket gears having the same general profile but being of different size.

Another object of the invention is to provide a sprocket gear which is defined by a point on a circle of relatively small diameter rolling about a pattern including a pair of diametrically opposed cycloid surfaces spaced in the direction of their minor axes and joined at their adjacent edges by arcs of a circle having a diameter corresponding with the length of the major axis of the cycloids. In a change-speed modification of this embodiment, a corresponding second gear is provided in which the circumferential profile is defined by the small diameter circle rolling on the inside of the aforementioned pattern.

Thus, the invention involves a bicycle or motorbike sprocket gear configuration characterized by the fact that its outline consists of two opposite cycloids, and further consisting of the fact that the two pedal cranks are diametrically arranged at an angle of from about 30° to about 40° with respect to the minor axes of the opposite cycloids, which angle is advanced relative to the minor axes relative to the power-delivering direction of rotation of the sprocket gear.

This predetermined angular value as a matter of fact is necessary to obtain the best possible efficiency. By angularly arranging the cranks relative to the minor axes, one takes into account the fact that the rider's seat is not placed along a vertical running through the rotation axis of the crank-gear so that the high dead point is not the highest point and, moreover, in the course of rotation of the crank-gear, the angle which is performed by the force exerted upon the pedal with the vertical varies quite considerably. For a standard man's bicycle, this angle is approximately between 17° and 30°.

According to another feature of the invention, the two cycloids are diametrically opposed relative to the center of the sprocket gear.

According to another feature of the invention, the two cycloids are removed from each other by a small distance and are connected by two circle arcs which are tangent to the cycloids.

According to another feature of the invention, each arc which is tangent to the cycloids has a value corresponding essentially to three teeth.

According to another feature of the invention, the angle of advance of the wedging of the cranks is between about 30° and 40° according to the spacing between the cycloids.

The invention also is intended to provide a speed-change crank-gear comprising at least two toothed crowns indicated above.

The invention also has the objective of providing a speed-change crank-gear comprising at least two toothed crowns, one of the crowns or base crown being a crown as defined above and the other crown being an enveloped curve whose contour is a contour defined by rolling a circle with a small diameter roll inside or outside the contour of the base profile.

In none of the numerous crank-gears previously proposed so far has use been made of two opposite cycloids as crank-gear contour, but rather one has generally used an ellipse. Now, the inconvenience of this latter curve derives from the fact that it is not well defined because it can be very close to a circle if the difference between its two axes is not sufficiently big. In this case one does not get a satisfactory result, regardless of the advance crank arm angle, whereas with the two opposing cycloids, a contour is achieved in which the difference between the two axes is always sufficient. Thus, in the improved drive means of the present invention, the crank arm advance angle is greater than previously proposed.

BRIEF DESCRIPTION OF THE DRAWING

Other objects and advantages of the invention will become apparent from a study of the following specification when viewed in the light of the accompanying drawing, in which:

FIG. 1 is a schematic illustration of the improved chain drive means of the present invention;

FIG. 2 is a schematic illustration of a second embodiment of the invention;

FIG. 5 is a schematic illustration of a third embodiment of the invention.

DETAILED DESCRIPTION

Figure 3:
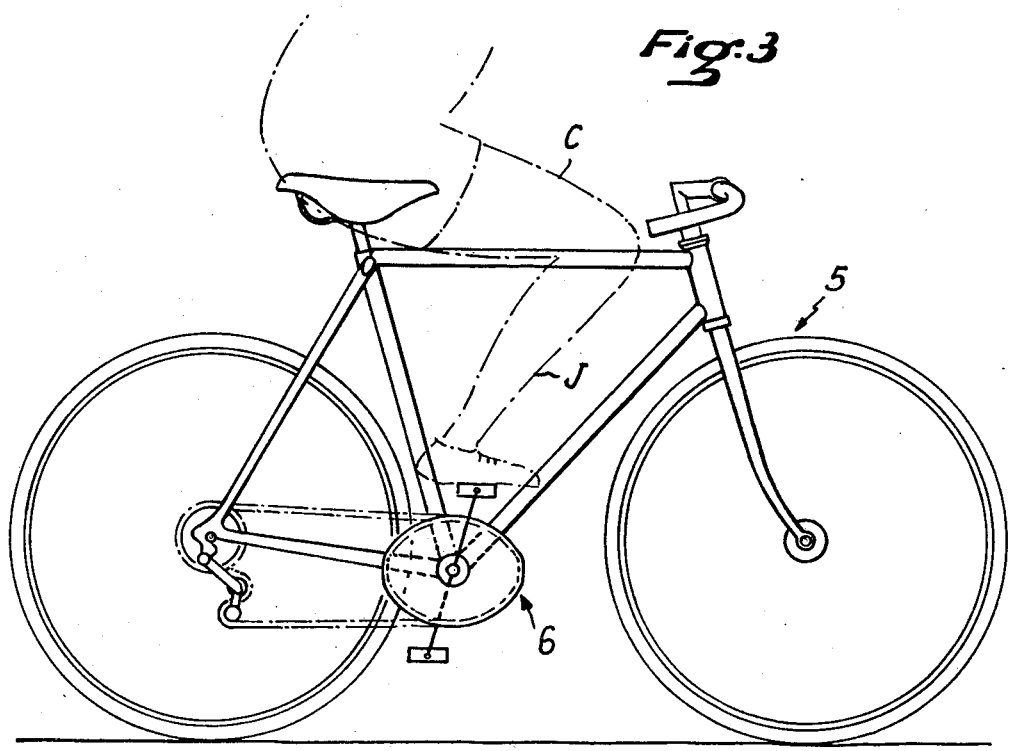
FIGS. 3 and 4 illustrate the sprocket gear means of FIG. 2 connected with a bicycle frame.

Referring first more particularly to FIG. 1, the sprocket chain drive gear has a circumferential profile configuration including a pair of diametrically opposed cycloids 1 and 2 having a common horizontal major axis L. The aligned crank arms 3 and 4 for the foot pedals 3a and 4a, respectively, are rigidly connected with the sprocket gear and extend diametrically radially outwardly from the center thereof. The arms are angularly advanced from the minor axis M of the sprocket gear relative to the power supplying direction of rotation thereof by the angle $\alpha$ (which is about 40°).

As is quite evident, in a cycloid, the ratio between the major axis and the minor axis is $(\pi D)/D$, D being the diameter of the generating circle, that is to say, approximately 3.14. Consequently, in the case of FIG. 1, the ratio between the major axis and the minor axis of the sprocket gears is about one-half $\pi$, or 1.57. This ratio is satisfactory for major efforts of short duration, such as when one starts a motorbike motor, but it is somewhat high for normal bicycle use.

Consequently, the modification illustrated in FIG. 2 is a more satisfactory solution for ordinary bicycles. By spacing the base lines of two cycloids apart by a distance d, the value of the minor axis is increased, as shown. The adjacent ends of the cycloids 1' and 2' are connected by arcs $\beta$ of a circle the diameter of which corresponds with the length of the major axis of the cycloids. Thus, the cycloids are connected by two circle arcs $\beta$ having as a center the middle O of the straight line linking the middles of the two straight lines, shown in the dot-dash lines, having served to generate the cycloids. In practice, it was found that, by interspersing three teeth between the two cycloids and at their ends, one gets a ratio of about 1.28, which affords a rather pleasing operation, but in accordance with the nature of the user and/or of the use, it is possible to intersperse from 1 to 5 teeth between the adjacent ends of the cycloids, respectively.

As shown in FIG. 2, the cranks 3 and 4, which are provided at their free ends with foot pedals 3a and 4a are secured to the sprocket gear 6 at an advance angle $\alpha$ of about 30° relative to the minor axes of the cycloids in the direction of rotation of the sprocket gear.

It is quite evident that in this figure the provision of three teeth at each end of the cycloids is not restrictive, although it seems to be an optimum for an ordinary bicycle rider. But in the case of other uses, for example, in the case of wheelchairs, tricycles, or tricycle delivery carts, or others, one could use a different number of teeth, for example, 1, 2, 4, or even 5.

FIG. 3 shows a bicycle 5 on which the crank-gear 6 of FIG. 2, with cycloids spaced apart, is in the position illustrated in FIG. 2. At this moment, the leg J of the rider is very much bent when compared to the thigh C and is not in a favorable position to make an effort. In this figure it is seen that the development force is minimal precisely at that moment.

As noted earlier, the cranks are angularly advanced with respect to the minor axes by an angle $\alpha$ in the direction of rotation. This feature is extremely important because, if absent, the bicycle rider would experience the sensation of pedalling in an irregular manner, whereas the purpose of the invention precisely is to obtain regular and pleasant pedalling.

Figure 4:
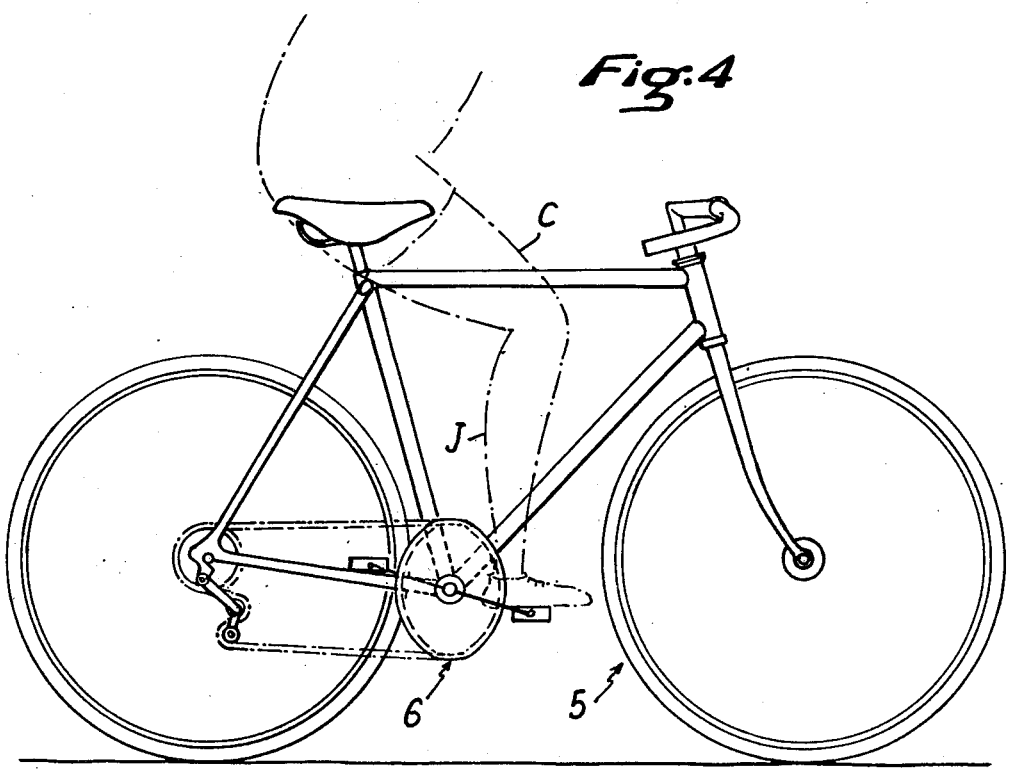

With the rider continuing to pedal and with the sprocket gear having been rotated through an angle of 90°, as illustrated in FIG. 4, maximum development force is achieved. At that moment, the position of the rider's leg is very favorable when it comes to furnishing the chain driving effort.

In practice, a rather surprising operating effect is achieved because, owing to the irregularity of the sprocket gear, the rider obtains the impression that he is pedalling regularly, even when travelling up inclines which may even have considerable slopes.

As we said earlier, one can introduce several crowns according to the invention into the makeup of the speed-change sprocket gear. One can use—to make up this new speed-change sprocket gear—one or more crowns which are derived from a cycloidal crown according to the invention by causing a circle with a small diameter to roll inside or outside the contour of the pattern crown. As shown in FIG. 5, by making the small circle 7 roll inside a pattern similar to FIG. 2, a resulting contour is obtained, as shown in the dotted lines, similar to the base contour and which will lead to further demultiplication, for example, to be used while going uphill. Likewise, by making circle 8 roll outside the pattern including two spaced and opposite cycloids, another contour is produced as shown in dotted lines, to be used, for example, for maximum speeds.

The implementation of the tooth crown with the cycloidal contour according to the invention is very easy. In effect, for each cycloid of a toothed crown, the length of the cycloid is equal to four times the diameter of the generating circle, or eight times the radius R of this circle.

Consequently, starting with a certain number of teeth, for example, 52 teeth, which is the usual number in the design of bicycles, and a normal pitch [thread] of 12.7 mm, we get for the plate, a certain perimeter P. Since the perimeter of the two opposing cycloids is P, each will have a perimeter P/2 equal to 8R. It is thus easy to design each cycloid by having a circle $R = P/16$ to roll along the straight line L. This affords a distinct advantage over the previously proposed elliptical or oval-type sprocket gears, which are designed by trial and error through successive approximations.

While in accordance with the provisions of the Patent Statutes, the preferred forms and embodiments have been illustrated and described, it will be apparent that changes may be made without deviating from the inventive concepts set forth above.

What is claimed is:

1. Means for driving the drive chain of a self-propelled vehicle including a frame, comprising:
   (a) a first sprocket gear adapted for rotatable connection at its center with the vehicle frame, the circumferential surface of said sprocket gear including a pair of diametrically opposed peripheral portions each having the configuration of a cycloid, said cycloid peripheral surfaces being radially spaced in the direction of the minor axis of said sprocket gear, the base lines of said cycloids being parallel and spaced on opposite sides of the major axis of said sprocket gear, the circumferential surface of said sprocket gear further including arcs of a circle connecting the adjacent ends of, and substantially tangent with, said cycloid peripheral surfaces, respectively, the diameter of said circle being equal to the length of the major axis of said sprocket gear, whereby the surfaces of the cycloids and the arcs merge smoothly; and
   (b) a pair of aligned foot pedal crank arms connected with, and extending diametrically outwardly in opposite directions from the center of, said sprocket gear;
   (c) said crank arms being angularly advanced, relative to the minor axis of said sprocket gear, in the power supplying direction of rotation of the sprocket gear by an angle of from about 30° to about 40°.

2. Apparatus as defined in claim 1, wherein each of said arcs of a circle include from 1 to 5 teeth.

3. Apparatus as defined in claim 1, and further including a second sprocket gear arranged coaxially with respect to, and rigidly connected adjacent with, said first sprocket gear, said second sprocket gear having major and minor axial lengths which are greater than the corresponding axial lengths of said first sprocket gear, said crank arms being arranged at the same angle relative to the minor axes of said first and second sprocket gears, whereby said first and second sprocket gears are alternately operable for changing the driving gear ratio of the bicycle.

4. Means for driving the drive chain of a self-propelled vehicle including a frame, comprising:
   (a) a first sprocket gear adapted for rotatable connection at its center with the vehicle frame, said sprocket gear having a circumferential profile generated by a first circle of relatively small diameter rolling about a pattern including a pair of diametrically opposed portions each having the configuration of a cycloid, said cycloid portions being spaced in the direction of the minor axis of the sprocket gear, the base lines of said cycloids being parallel and spaced on opposite sides of the major axis of said cycloids, and portions defining arcs of a further circle connecting the adjacent ends of, and substantially tangent with, said cycloid portions, respectively, the diameter of said further circle being equal to the length of the major axis of said sprocket gear, whereby the surfaces of the cycloids and the arcs merge smoothly;
   (b) a pair of aligned foot pedal crank arms connected with, and extending diametrically outwardly in opposite directions from the center of, said sprocket gear;
   (c) said crank arms being angularly advanced, relative to the minor axis of said sprocket gear, in the power supplying direction of rotation of the sprocket gear by an angle of from about 30° to about 40°.

5. Apparatus as defined in claim 4, and further including a second sprocket gear connected coaxially with said first sprocket gear, the circumferential profile of said second sprocket gear being generated by said first circle rotating along the inner surface of said pattern, said crank arms being arranged at the same angle relative to the minor axes of said first and second sprocket gears, whereby said first and second sprocket gears are alternately operable for changing the driving gear ratio of the vehicle.

* * * * *